United States Patent [19]

Haaf

[11] Patent Number: 4,544,703
[45] Date of Patent: Oct. 1, 1985

[54] HIGH IMPACT THERMOPLASTIC COMPOSITIONS CONTAINING DIBLOCK IMPACT MODIFIER

[75] Inventor: William R. Haaf, Voorheesville, N.Y.

[73] Assignee: General Electric Company, Pittsfield, Mass.

[21] Appl. No.: 308,181

[22] Filed: Oct. 2, 1981

[51] Int. Cl.[4] .................... C08L 53/02; C08L 71/04
[52] U.S. Cl. ......................................... 525/92; 525/98
[58] Field of Search ........................................ 525/92

[56] References Cited

U.S. PATENT DOCUMENTS

| | | | |
|---|---|---|---|
| 3,383,435 | 5/1968 | Gizek | 525/132 |
| 3,660,531 | 5/1972 | Laughlan et al. | 525/98 |
| 3,943,191 | 3/1976 | Cooper et al. | 260/42.18 |
| 3,959,211 | 5/1976 | Cooper et al. | 260/42.18 |
| 3,974,235 | 8/1976 | Cooper et al. | 260/42.18 |
| 4,101,503 | 7/1978 | Cooper et al. | 260/42.18 |
| 4,101,504 | 7/1978 | Cooper et al. | 260/42.18 |
| 4,101,505 | 7/1978 | Cooper et al. | 260/42.18 |
| 4,102,850 | 7/1978 | Cooper et al. | 260/33.6 AQ |
| 4,153,644 | 5/1979 | Sugio et al. | 525/92 |
| 4,167,507 | 9/1979 | Haaf | 525/92 |

FOREIGN PATENT DOCUMENTS

| | | | |
|---|---|---|---|
| 914816 | 11/1972 | Canada | 525/92 |
| 3015514 | 11/1980 | Fed. Rep. of Germany | 525/92 |

*Primary Examiner*—Wilbert J. Briggs, Sr.
*Attorney, Agent, or Firm*—Hedman, Gibson Costigan & Hoare

[57] ABSTRACT

The present invention relates to improved thermoplastic compositions comprising polyphenylene ether and polyalkenyl aromatic resin. In these compositions, a diblock copolymer of from 45 to 60% polystyrene and from 55 to 40% hydrogenated polybutadiene by weight is utilized as at least a portion of the polyalkenyl aromatic resin. This block copolymer substantially improves the physical properties—most particularly, the impact strength—of the compositions.

8 Claims, No Drawings

HIGH IMPACT THERMOPLASTIC COMPOSITIONS CONTAINING DIBLOCK IMPACT MODIFIER

BACKGROUND OF THE INVENTION

Thermoplastic compositions containing polyphenylene ether (or oxide) in admixture with alkenyl aromatic resins are well known. Examples are, for instance, described in U.S. Pat. No. 3,383,435 of Eric P. Cizek, the disclosure of which is incorporated herein by reference. Such compositions are most generally employed in the production of molded and/or extruded articles where the alkenyl aromatic resins are responsible for greatly improved physical properties, the most critical of which is often impact strength.

Because of this importance, much effort has been expended toward further improvement of the impact strengths of the present compositions. Notwithstanding this effort and some substantial further improvement, still better impact strengths remain a highly desirable industrial objective.

INTRODUCTION OF THE INVENTION

The present invention relates to improved thermoplastic compositions comprising polyphenylene ether and polyalkenyl aromatic resin. In these compositions, a diblock copolymer of from 45 to 60% polystyrene and from 55 to 40% hydrogenated polybutadiene by weight is utilized as at least a portion of the polyalkenyl aromatic resin. This block compolymer substantially improves the physical properties—most particularly, the impact strength—of the compositions.

DESCRIPTION OF THE INVENTION

The polyphenylene oxide resins useful in accordance with the present kinds of compositions are, as previously indicated, individually well known and readily available. There are, however, various preferred composition components. These are primarily ones commonly having applications for which high impact strength is particularly desirable.

The preferred polyphenylene ethers are homo- and copolymers of the formula:

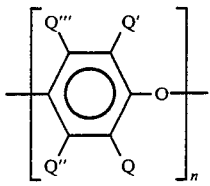

wherein Q, Q', Q" and Q''' are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q''' in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene)ether.

The alkenyl aromatic resins are likewise well known and are preferably derived from monomers of the formula:

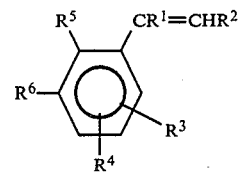

wherein $R^1$ and $R^2$ are selected from the group consisting of lower alkyl or alkenyl groups of from 1 to 6 carbon atoms and hydrogen. $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 5 carbon atoms or $R^5$ or $R^6$ may be concatenated together with hydrocarbyl groups to form a naphthyl group. These compounds are also desirably free of any substituent that has a tertiary carbon atom.

Specific examples of alkenyl aromatic monomers include styrene, chlorostyrene, alpha-methylstyrene, vinyl xylene, divinyl benzene and vinyl naphthalene. Styrene is particularly preferred.

As is described in the above mentioned Cizek patent, modifiers such as butadiene may be incorporated into the alkenyl aromatic resins to improve the properties of resultant compositions. Other such modifiers are also known. These include block and hydrogenated block copolymers such as are described in U.S. Pat. No. 3,660,531 of Lauchlan et al. or 4,167,507 of Haaf. Similarly, graft-modified polymers are described in U.S. Pat. Nos. 3,943,191; 3,959,211; 3,974,235; 4,101,503; 4,101,504; 4,101,505; and 4,102,850 of Glen D. Cooper et al. and elsewhere. All of these modified polyalkenyl aromatic resins are also within the scope of the present invention.

The polyphenylene ether and polyalkenyl aromatic resin may be present in virtually any proportion in the present blends. For optimum physical properties in the blend, however, they are preferably in a weight ratio of from about 1:4 to 4:1, respectively. A weight ratio of about 1:1 is particularly desirable.

In the present compositions, at least 5% of the polyalkenyl aromatic resin is preferably a special diblock copolymer impact modifier of polystyrene and hydrogenated polybutadiene. This copolymer may be formed by conventional block polymerization of the styrene and butadiene, followed by selective saturation of the non-aromatic portion of the resultant copolymer.

In this special diblock copolymer, the polystyrene block should represent from 45 to 60%, more desirably from 50 to 55% by total weight. The monomer employed in producing this block is desirably selected from one or more of the preferred alkenyl aromatic resin monomers set forth above. The hydrogenated (or saturated) polybutadiene-derived block should correspondingly amount to from 55 to 60% or 50 to 45% by total weight of copolymer.

The compositions of the present invention are preferably prepared first by fine admixture of their ingredients; they are then desirably melt blended. This may, for example, be accomplished simply by coextrusion. A substantially homogeneous admixture is preferred.

Once prepared, the present compositions may be utilized for any of the diverse purposes for which similar polyphenylene ether/polyalkenyl aromatic resin compositions have already been employed. For example, they can be used in molding powder formulations, and may contain various fillers, such as diatomaceous earth, carbon black, silica, etc., to make molded parts, such as spur, helical, worm or bevel gears, ratchets, bearings, cams, and impact parts.

They can also be used to prepare molded, calendered, or extruded articles, films, coatings, threads, filaments, tapes and the like. They can be applied to a broad spectrum of uses in the form of sheets, rods, tapes, etc. and are useful in electrical applications, such as in cable terminals, terminal blocks, backing for electrical circuits, as components of dynamoelectric machines that operate at high temperatures, etc.

Films of these compositions can be prepared by suitable means, such as by calendering, extrusion, etc. These films are useful as metal or fiber liners, containers, covers, closures, electrical insulating tapes, as sound recording tapes, magnetic tapes, photographic films, pipe and wire tapes, etc.

As a coating material, they can be applied as a solution or suspension to any convenient foundation where a surface possessing their excellent properties is desired.

Their excellent electrical properties make laminates of this material useful for electrical equipment, such as slot wedges in the armature of an electric motor, panel boards for printed circuits, electrical appliance panels, radio and television panels, small punched electrical pieces, transformer terminal boards, transformer coil spacers, etc.

The present compositions may also be mixed with various fillers, modifying agents, etc. such as dyes, pigments, stabilizers, etc. Additional thermoplastic resins and/or fire retardants may also be incorporated. All this may be performed in a conventional manner.

The following examples are given by way of illustration only and are not intended as a limitation on the scope of this invention. Many variations are possible without departing from its spirit and scope. Unless otherwise specified herein all proportions are provided on a weight basis.

EXAMPLE 1

Sample thermoplastic compositions containing a 1:1 weight ratio of polyphenylene ether to polyalkenyl aromatic resin are prepared. The samples vary in their polyalkenyl aromatic resin constituents. This is accomplished by incorporating different mixtures of:

Polystyrene—Dylene ® homopolystyrene produced by Arco and having a number average molecular weight of 137,000;

Triblock—Kraton ® polystyrene triblock produced by Shell and containing 67% saturated polybutadiene;

Diblock 64—Shellvis ® polystyrene diblock produced by Shell and containing 64% saturated polybutadiene; and Diblock 48—"VII Phil Ad" polystyrene diblock produced by Philips and containing 48% saturated polybutadiene.

To provide meaningful results, the amounts of block copolymer are modified to provide sample comparisons based on equal saturated polybutadiene concentrations.

After extrusions in a Werner-Pfleiderer 28 mm twin screw extruder at 580° F. melt and 20 in.-Hg. vent vacuum, pellets are formed by chopping the resultant strands and molding in a 4 oz. Newbury machine at 550° F. melt/180° F. mold surface. The moldings are then tested for notched Izod (ft.lb./in.-n) and Gardner (in.-lb.) impact strength and exhibit the following properties:

TABLE I

| Sample | High Impact Polystyrene | Saturated Block Copolymer | | | % Butadiene | Impact Strength | |
|---|---|---|---|---|---|---|---|
| | | Triblock | Diblock 64 | Diblock 48 | | Izod | Gardner |
| 1 | 50.0 | — | — | — | 0.00 | 0.4 | <5 |
| 2 | 40.0 | 10.0 | — | — | 6.70 | 0.8 | 20 |
| 3 | 39.5 | — | 10.5 | — | 6.72 | 0.7 | <5 |
| 4 | 36.0 | — | — | 14.0 | 6.72 | 1.5 | 300–400 |
| 5 | 33.0 | 17.0 | — | — | 11.39 | 1.8 | 140 |
| 6 | 32.2 | — | 17.8 | — | 11.39 | 0.9 | 10 |
| 7 | 26.3 | — | — | 23.7 | 11.38 | 8.0 | 180 |
| 8 | 25.0 | 25.0 | — | — | 16.75 | 6.1 | 170 |
| 9 | 23.8 | — | 26.2 | — | 16.77 | 6.2 | 120 |
| 10 | 15.1 | — | — | 34.9 | 16.75 | 8.9 | 180 |

In each instance, sample compositions containing the intermediate diblock copolymer of the present invention exhibit significant increases in overall impact strength. This is true both in comparison to the polystyrene control sample No. 1 (no butadiene contact) and high butadiene content di- and tri-block sample No's. 3, 6, 9 and 2, 5, 8 respectively.

EXAMPLE II

The comparisons of Example I are repeated utilizing, instead of homopolystyrene as the base polyalkenyl aromatic resin, a high impact polystyrene contain 10.5 weight percent of graft butadiene interpolymer. The results of physical testing are as follows:

TABLE II

| Sample | High Impact Polystyrene | Saturated Block Copolymer | | | % Butadiene | Impact Strength | |
|---|---|---|---|---|---|---|---|
| | | Triblock | Diblock 64 | Diblock 48 | | Izod | Gardner |
| 11 | 50.0 | — | — | — | 5.25 | 3.0 | 115 |
| 12 | 45.0 | 5.0 | — | — | 8.08 | 4.2 | 170 |
| 13 | 44.7 | — | 5.3 | — | 8.09 | 4.5 | 170 |
| 14 | 42.5 | — | — | 7.5 | 8.06 | 4.5 | 220 |
| 15 | 38.0 | 12.0 | — | — | 12.03 | 7.5 | 230 |
| 16 | 37.3 | — | 12.7 | — | 12.04 | 6.8 | 230 |
| 17 | 31.9 | — | — | 18.1 | 12.04 | 8.8 | 190 |
| 18 | 30.0 | 20.0 | — | — | 16.55 | 9.2 | — |

TABLE II-continued

| Sample | High Impact Polystyrene | Saturated Block Copolymer | | | % Butadiene | Impact Strength | |
|---|---|---|---|---|---|---|---|
| | | Triblock | Diblock 64 | Diblock 48 | | Izod | Gardner |
| 19 | 28.9 | — | 21.1 | — | 16.54 | 8.4 | — |
| 20 | 19.9 | — | — | 30.1 | 16.54 | 9.8 | — |

Again, the diblock copolymers of the instant invention produce superior overall impact strength.

EXAMPLE III

The comparisons of Example I are repeated utilizing, instead of homopolystyrene, another high impact strength polystyrene containing 12 weight percent of graft butadiene interpolymer. The results of physical testing are as follows:

TABLE III

| Sample | High Impact Polystyrene | Saturated Block Copolymer | | | % Butadiene | Impact Strength | |
|---|---|---|---|---|---|---|---|
| | | Triblock | Diblock 64 | Diblock 48 | | Izod | Gardner |
| 21 | 50.0 | — | — | — | 6.00 | 4.1 | 180 |
| 22 | 45.0 | 5.0 | — | — | 8.75 | 5.8 | 230 |
| 23 | 44.7 | — | 5.3 | — | 8.76 | 6.8 | 230 |
| 24 | 42.4 | — | — | 7.6 | 8.74 | 6.8 | 230 |
| 25 | 38.0 | 12.0 | — | — | 12.60 | 8.4 | 240 |
| 26 | 37.3 | — | 12.7 | — | 12.60 | 8.0 | 230 |
| 27 | 31.7 | — | — | 18.3 | 12.60 | 9.2 | 180 |
| 28 | 30.0 | 20.0 | — | — | 17.00 | 10.6 | — |
| 29 | 28.8 | — | 21.2 | — | 17.02 | 10.0 | — |
| 30 | 19.4 | — | — | 30.6 | 17.02 | 9.9 | — |

The results again show the superiority of the intermediate butadiene content diblock copolymers of the present invention.

EXAMPLE IV

Sample thermoplastic compositions are prepared as in Example I. In distinction from the procedure of Example I, these samples also have differing polyphenylene ether concentrations and only block copolymers as polyalkenyl aromatic resins.

Test samples are compounded in a Werner-Pfleiderer 28 mm twin-screw extruder operating at 575° F. and no vacuum. The chopped extrudates are then molded in a 4 oz. Newbury machine at 575° F. set/190° F. actual mold.

These sample compositions and the results of physical testing are as follows:

TABLE IV

| Sample | Polyphenylene Ether | Saturated Block Copolymer | | | % Saturated Butadiene | Izod Impact |
|---|---|---|---|---|---|---|
| | | Triblock | Diblock 64 | Diblock 48 | | |
| 31 | 96.0 | 4 | — | — | 2.48 | 1.5 |
| 32 | 95.8 | — | 4.2 | — | 2.49 | 1.4 |
| 33 | 94.4 | — | — | 5.6 | 2.49 | 1.4 |
| 34 | 92.0 | 8 | — | — | 4.96 | 2.6 |
| 35 | 91.6 | — | 8.4 | — | 4.98 | 1.8 |
| 36 | 88.8 | — | — | 11.2 | 4.98 | 3.8 |
| 37 | 88.0 | 12 | — | — | 7.44 | 6.2 |
| 38 | 87.4 | — | 12.6 | — | 7.47 | 2.4 |
| 39 | 83.3 | — | — | 16.7 | 7.42 | 12.1 |

These results reflect the comparative superiority of even small amounts of the intermediate diblock copolymers on the present compositions. They also show that such results are independent of the presence of other polyalkenyl aromatic resin.

From review of all four Example Tables, it is apparent that the diblock copolymers of this invention are effective impact strength modifiers virtually without regard to composition proportions or the nature of other polyalkenyl aromatic resins which may be present.

The above mentioned patents and/or publications are incorporated herein by reference. Obviously, other modifications and variations of the present invention are possible in the light of the above teachings, as well as those of the patents identified hereinabove. For instance, instead of poly(2,6-dimethyl-1,4-phenylene) ether, copolymers such as poly(2,6-dimethyl-co-2,3,6-trimethyl-1,4-phenylene)ether can be employed. The compositions can also include other ingredients such as flame retardant and/or drip retardant agents, antioxidants, processing aids, fillers/reinforcements, colorants, plasticizers, in conventional amounts. It is, therefore, to be understood that changes may be made in the particular embodiments of the invention described which are within the full intended scope of the invention as defined by the appended claims.

I claim:

1. In a thermoplastic composition comprising a blend of polyphenylene ether and polyalkenyl aromatic resin, the improvement wherein said polyalkenyl aromatic resin comprises diblock copolymer of from 50 to 60% polystyrene and from 50 to 40% hydrogenated polybutadiene by weight.

2. The composition of claim 1, wherein the polyphenylene ether and polyalkenyl aromatic resin are in a weight ratio of from about 1:4 to 4:1.

3. The composition of claim 2, wherein the polyalkenyl aromatic resin comprises at least 5% of diblock copolymer by weight.

4. The composition of claim 3, wherein the diblock copolymer comprises from 50 to 55% polystyrene and 50 to 45% hydrogenated polybutadiene by weight.

5. The composition of claim 4, wherein the polyphenylene ether and polyalkenyl aromatic resin are present in a weight ratio of approximately 1:1.

6. The composition of claim 5, wherein the polyalkenyl aromatic resin additionally comprises homopolystyrene.

7. The composition of claim 1, wherein the polyalkenyl aromatic resin additionally comprises homopolystyrene.

8. The composition of claim 1, wherein the polystyrene block of the copolymer is produced from monomer having the formula:

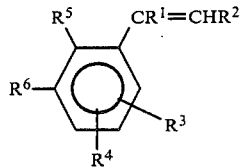

wherein:
$R^1$ and $R^2$ are selected from the group consisting of lower alkyl or alkenyl groups of from 1 to 6 carbon atoms and hydrogen;
$R^3$ and $R^4$ are selected from the group consisting of chloro, bromo, hydrogen and lower alkyl of from 1 to 6 carbon atoms;
$R^5$ and $R^6$ are selected from the group consisting of hydrogen and lower alkyl and alkenyl groups of from 1 to 6 carbon atoms; or
$R^5$ and $R^6$ may be concatenated together with hydrocarbyl groups to form a naphthyl group.

* * * * *